(12) United States Patent
Kuriyama

(10) Patent No.: US 9,073,463 B2
(45) Date of Patent: Jul. 7, 2015

(54) SEAT BACK MOVEMENT PREVENTION DEVICE OF BELT-IN SEAT

(75) Inventor: Yoshitsugu Kuriyama, Niiza (JP)

(73) Assignee: UD TRUCKS CORPORATION, Saitma (JP)

( * ) Notice: Subject to any disclaimer, the term of this patent is extended or adjusted under 35 U.S.C. 154(b) by 0 days.

(21) Appl. No.: 13/989,085

(22) PCT Filed: Nov. 25, 2010

(86) PCT No.: PCT/JP2010/006888
§ 371 (c)(1),
(2), (4) Date: May 23, 2013

(87) PCT Pub. No.: WO2012/070091
PCT Pub. Date: May 31, 2012

(65) Prior Publication Data
US 2013/0241250 A1    Sep. 19, 2013

(51) Int. Cl.
| | |
|---|---|
| *A47C 31/00* | (2006.01) |
| *B60N 2/433* | (2006.01) |
| *B60N 2/16* | (2006.01) |
| *B60N 2/42* | (2006.01) |
| *B60R 22/02* | (2006.01) |
| *B60R 22/46* | (2006.01) |
| *B60N 2/68* | (2006.01) |
| *B60N 2/427* | (2006.01) |
| *B60R 22/26* | (2006.01) |

(52) U.S. Cl.
CPC ............ *B60N 2/433* (2013.01); *B60N 2/1685* (2013.01); *B60N 2/43* (2013.01); *B60R 22/023* (2013.01); *B60R 22/26* (2013.01); *B60R 22/46* (2013.01); *B60R 2022/4609* (2013.01); *B60N 2/688* (2013.01); *B60N 2/4221* (2013.01); *B60N 2/42745* (2013.01)

(58) Field of Classification Search
USPC ............ 297/216.17, 216.13, 216.16, 216.19, 297/474, 475; 280/804, 808
See application file for complete search history.

(56) References Cited

U.S. PATENT DOCUMENTS 4,832,366 A * 5/1989 Corbett et al. ................ 280/808
(Continued)

FOREIGN PATENT DOCUMENTS

| | | |
|---|---|---|
| DE | 34 29 426 A1 | 2/1986 |
| FR | 2 851 974 A1 | 9/2004 |
| JP | H5-80924 | 11/1993 |
| JP | 2000-043628 | 2/2000 |
| JP | 2006-175901 | 7/2006 |
| JP | 2007-145264 | 6/2007 |

OTHER PUBLICATIONS

Translation of International Report on Patentability and Written Opinion; International Application No. PCT/JP2010/006888; International Filing Date: Nov. 25, 2010.
(Continued)

*Primary Examiner* — Laurie Cranmer
(74) *Attorney, Agent, or Firm* — Oliff PLC

(57) ABSTRACT

A seat back movement prevention device of a belt-in seat enables a certain prevention of falling down of a seat back at a vehicle collision time of a vehicle mounting a 3-point belt-in seat, the seat back movement prevention device of a belt-in seat is made of one of a belt, a wire, and a chain of which one end side is attached to an upper part of a seat frame disposed in a seat back of a 3-point belt-in seat, and a pretensioner for a seat back being equipped at downward of the seat back, and rewinding one of the belt, the wire, and the chain at an activation time of a pretensioner for a seat belt.

2 Claims, 3 Drawing Sheets

(56) References Cited

U.S. PATENT DOCUMENTS

| | | | | |
|---|---|---|---|---|
| 5,015,010 | A * | 5/1991 | Homeier et al. | 280/808 |
| 5,292,178 | A * | 3/1994 | Loose et al. | 297/344.1 |
| 5,743,597 | A * | 4/1998 | Jessup et al. | 297/474 |
| 6,065,777 | A * | 5/2000 | Merrick | 280/804 |
| 6,267,409 | B1 * | 7/2001 | Townsend et al. | 280/801.1 |
| 6,582,015 | B2 * | 6/2003 | Jessup et al. | 297/216.17 |
| 6,631,926 | B2 * | 10/2003 | Merrick et al. | 280/804 |
| 7,029,067 | B2 * | 4/2006 | Vits et al. | 297/238 |
| 8,485,600 | B2 * | 7/2013 | Forsman et al. | 297/216.17 |

OTHER PUBLICATIONS

Notification Concerning Transmittal of International Preliminary Report on Patentability; International Application No. PCT/JP2010/006888; International Filing Date: Nov. 25, 2010.

Supplementary European Search Report; Application No. EP 10 86 0016; Date: Jun. 6, 2014.

International Search Report; International Application No. PCT/JP2010/006888; International Filing Date: Nov. 25, 2010.

* cited by examiner

Fig. 1
Fig. 2
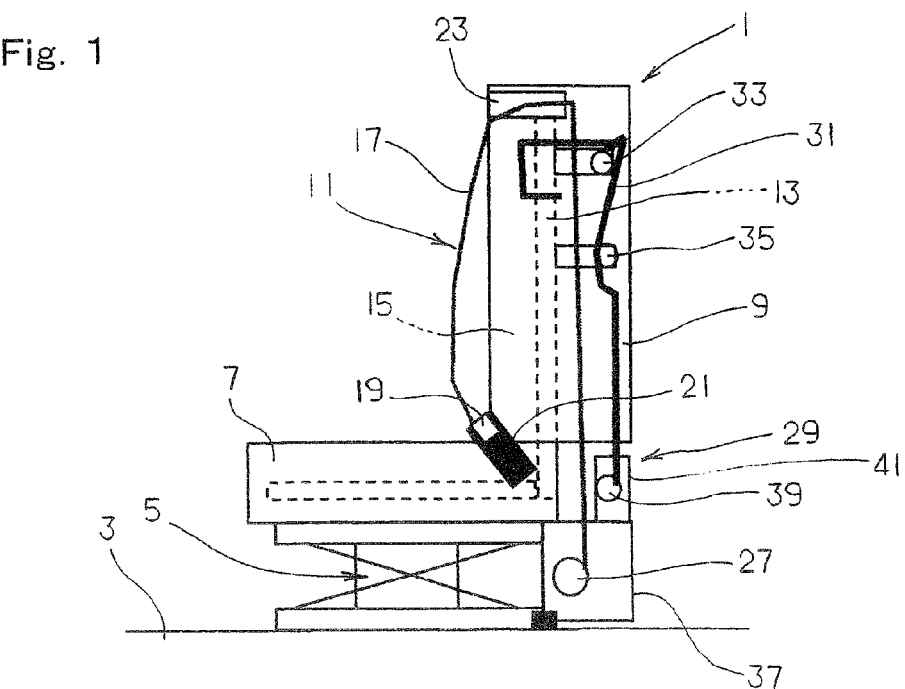
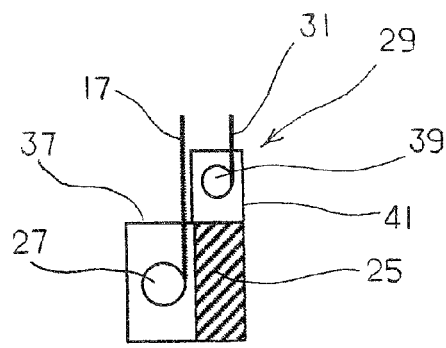

SEAT BACK MOVEMENT PREVENTION DEVICE OF BELT-IN SEAT

CROSS-REFERENCE TO RELATED APPLICATION

This application is a U.S. national stage application under 35 U.S.C. §371 claiming benefit of prior filed International Application No. PCT/JP2010/006888 filed Nov. 25, 2010, the entire contents of which are incorporated by reference.

TECHNICAL FIELD

The present application relates to a seat back movement prevention device of a belt-in seat, in detail, to a seat back movement prevention device preventing falling down of the seat back toward forward at a time of head-on collision between two cars.

BACKGROUND ART

Approximately eight out of ten of driver seats (hereinafter, called as a "seat") of commercial vehicles (in particular, large trucks) in European markets are 3-point belt-in seats. The belt-in seat is the one in which a seat belt is not fixed to a vehicle but attached to a seat in itself, and a shoulder strap thereof is fixed not to a B-pillar of a vehicle body but to a backrest of the seat.

The seat belt is attached to the seat in itself as stated above, and thereby, it is possible to wear the seat belt under optimum state compared to a conventional seat belt and to enhance a protection effect owing to the seat belt because the seat belt follows a movement of the seat by an air suspension especially as for a large truck being equipped with the air suspension as a seat suspension.

On the other hand, the belt-in seat in which the seat and seat belt are integrated tends to move forward because a seat back is pulled together with the shoulder strap caused by an inertia force of a passenger at a time of a head-on collision between two cars (hereinafter, called as a "vehicle collision time"). As a result, a belt binding force is lowered compared to a normal seat belt (belt-in cabin), a breast movement amount of the passenger increases, and there is a possibility in which the breast is smashed against a steering wheel.

Besides, a reinforcing structure of a seat preventing falling down of a seat back toward forward at a vehicle collision time is disclosed in Patent Document 1.

This conventional example is the one in which an engagement unit including an engagement claw is provided at a sidewall of a seat back facing a vehicle sidewall, and a bracket including a wire is provided at an inner wall of a door to face the engagement unit, and the falling down of the seat back at the vehicle collision time is prevented by the engagement between the engagement claw and the wire.

PRIOR ART DOCUMENT

Patent Document

Patent Document 1: Japanese Unexamined Patent Application Publication No. 2007-145264

DISCLOSURE

Problems to be Solved

However, if the door is deformed by an impact at the vehicle collision time and the bracket is deformed and damaged, there is a possibility in the conventional example in which the engagement claw does not engage with the wire, and the seat back falls forward together with the passenger.

The present invention is made to correspond to the actual circumstances as stated above, and a proposition thereof is to provide a seat back movement prevention device of a belt-in seat enabling a certain falling down prevention (reduction in breast movement amount) of a seat back at a vehicle collision time of a vehicle mounting a 3-point belt-in seat.

Means for Solving the Problems

To attain the proposition as stated above, a seat back movement prevention device of a belt-in seat according to a first aspect of the embodiment in which one of a belt, a wire, and a chain of which one end side is attached to an upper part of a seat frame disposed in a seat back of a 3-point belt-in seat; and a pretensioner for a seat back being equipped at downward of the seat back, and rewinding one of the belt, the wire, and the chain at an activation time of a pretensioner for a seat belt, are included.

The invention according to a second aspect of the embodiment in which the pretensioner for the seat back is incorporated in a casing of the pretensioner for the seat belt in the seat back movement prevention device of the belt-in seat according to the first aspect of the embodiment.

Besides, the invention according to a third aspect of the embodiment in which the 3-point belt-in seat is equipped with an air suspension functioning as a seat suspension and a tether belt adjusting a movement amount of the air suspension, and a pretensioner for the tether belt rewinding the tether belt at an activation time of the pretensioner for the seat back is included at downward of the seat back in the seat back movement prevention device of the belt-in seat according to the first and second aspects of the embodiment.

Further, the invention according to a fourth aspect of the embodiment in which the pretensioner for the seat back functions also as the pretensioner for the tether belt, and rewinds the tether belt simultaneously with the rewinding of one of the belt, the wire, and the chain in the seat back movement prevention device of the belt-in seat according to the third aspect of the embodiment.

Effects of the Invention

According to the invention in accordance with the first aspect of the embodiment, it is possible to certainly prevent the falling down of the seat back (reduction in breast movement amount), the seat back is not pulled and moves forward together with the shoulder strap caused by the inertia force of the passenger at the collision time, and as a result, there is not a possibility in which the passenger smashes the breast thereof to the stearing wheel even if the door is deformed by the impact at the vehicle collision time.

In addition, a conventional and publicly-known pretensioner is used as the seat back movement prevention device, and thereby, it is possible to provide at a low price and by a development for a short period of time.

According to the inventions in accordance with the second and fourth aspects of the embodiment, it is possible to make a whole of the seat back movement prevention device small, and therefore, there is an advantage in which mountability into a cabin improves.

Besides, according to the invention in accordance with the third aspect of the embodiment, it is possible to more certainly prevent the falling down of the seat back by suppressing and preventing the falling down of the whole of the belt-in seat including the seat back toward forward.

BRIEF DESCRIPTION OF THE DRAWINGS

FIG. 1 is a side view of a belt-in seat being equipped with a seat back movement prevention device according to an embodiment in accordance with the first aspect.

FIG. 2 is a schematic configuration diagram of the seat back movement prevention device.

DETAILED DESCRIPTION OF THE EMBODIMENTS

Figure 3:
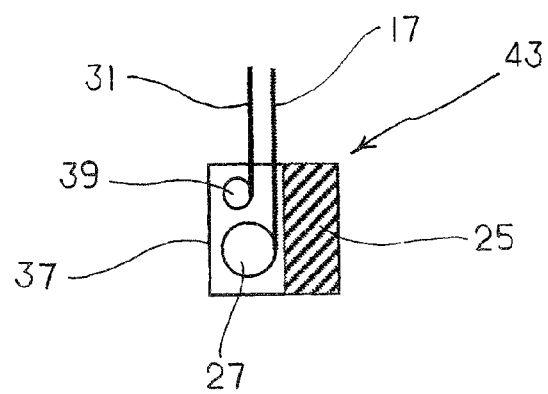
FIG. 3 is a schematic configuration diagram of the seat back movement prevention device according to an embodiment in accordance with the first and second aspects.

Hereinafter, embodiments of the present invention are described based on the drawings.

FIG. 1 and FIG. 2 illustrate an embodiment of a seat back movement prevention device according to the first aspect. In the drawing, a reference numeral 1 represents a belt-in seat provided at a vehicle floor 3 via a sliding device (not illustrated).

The belt-in seat 1 is made up of a seat cushion 7 coupled to a sliding mechanism via an air suspension (seat suspension) 5, a seat back 9 coupled to a rear part of the seat cushion 7 via a reclining device (not illustrated), and a seat belt device 11 incorporated in the belt-in seat 1. A seat frame 13 is housed in the seat back 9, and an outer periphery thereof is covered with a cushion material 15 and so on.

The seat belt device 11 is a 3-point seat belt made up of a shoulder strap 17 and a lap strap (not illustrated). The shoulder strap 17 is made up to be inserted into a tongue 19 at a lower end thereof, fold back by the tongue 19, and thereafter, continues into the lap strap. A tip of the lap strap is fixed to an anchor (not illustrated) being equipped at an outer side in a vehicle width direction of the seat cushion 7, and the tongue 19 is capable of engaging and disengaging to an inner buckle 21 being equipped at an inner side in the vehicle width direction of the seat cushion 7.

On the other hand, an inlet port 23 introducing the shoulder strap 17 into the seat back 9 is provided at a right shoulder upper part of the seat back 9. A tip of the shoulder strap 17 guided toward downward from the inlet port 23 by passing through inside the seat back 9 is coupled to a pretensioner (a pretensioner for a seat belt) 27 attached to a well-known ELR (Emergency Locking Retractor) 25 as illustrated in FIG. 1 and FIG. 2.

As it is well known, the pretensioner is a device accelerating binding start of a passenger by automatically rewinding the seat belt when an impact at the vehicle collision time is sensed. Generally, gunpowder is used for actuation of the pretensioner, and it is made up to draw in a webbing and a buckle owing to a force of gas generated when the gunpowder explodes. A sensor of an airbag device mounted on the vehicle is commonly used as a sensor sensing the impact, and a gas generator of the pretensioner generates the gas by an instruction of a control unit to which a signal from the sensor sensing the impact at the vehicle collision time is input, a shaft of a retractor is rotated by a rotor in a pretensioner to thereby immediately rewind looseness of the seat belt to accelerate the binding of the passenger.

The present embodiment is characterized in that a seat back movement prevention device 29 preventing the falling down of the seat back 9 toward forward at the vehicle collision time is further included in addition to a configuration similar to the conventional art as stated above.

Namely, a reference numeral 31 in FIG. 1 is a belt of which one end side is coupled to an upper part of the seat frame 13, and the belt 31 is formed by using the same material and to be approximately the same width as the shoulder strap 17. Note that a wire and a chain may be used instead of the belt 31.

The belt 31 is guided toward downward in the seat back 9 via upper and lower two tension pulleys 33, 35 being equipped inside the seat back 9, and directed to outside by penetrating at a lower part of the seat back 9. A casing 37 accommodating the ELR 25 and the pretensioner 27 is disposed at downward of the seat back 9, further, a casing 41 accommodating a second pretensioner (a pretensioner for the seat back) 39 is disposed on the casing 37, and a lower end of the belt 31 penetrates at an upper part of the casing 41 to be coupled to the pretensioner 39 inside thereof as illustrated in FIG. 1.

The pretensioner 39 for the seat back 9 has the same structure as a conventional and well-known motor pretensioner, rewinds the belt 31 at an activation time of the pretensioner 27 by a built-in motor (not illustrated) of which sensor is commonly used with the sensor of the airbag device, rewinds the belt 31 by the motor being activated for a time set in advance by the instruction of the control unit to which the signal from the sensor sensing the impact at the vehicle collision time is input. The belt 31 is locked by a gear to thereby suppress and prevent the falling down of the seat back 9 toward forward by the belt 31 from backward of the seat back 9.

The present embodiment is made up as stated above, and therefore, an inflator is ignited and an airbag expands by the instruction of the control unit to which the signal of the sensor sensing the impact is input when the vehicle collides, at the same time, the gas generator of the pretensioner 27 generates the gas to activate the ELR 25, and thereby, the loosenesses of the shoulder strap 17 and the lap strap are immediately rewound, further, the motor of the pretensioner 39 rewinds the belt 31 by the instruction of the control unit, the gear locks the belt 31, and thereby, the falling down of the seat back 9 toward forward is certainly suppressed and prevented by the belt 31 from backward.

According to the present embodiment, it is possible to certainly prevent the falling down of the seat back 9 (reduction in the breast movement amount), the seat back 9 does not move forward by being pulled together with the shoulder strap 17 resulting from the inertia force of the passenger at the collision time even if the door deforms by the impact at the vehicle collision time, as a result, there is not a possibility in which the passenger smashes his breast against the steering wheel.

In addition, the conventional and well-known motor pretensioner is used as the seat back movement prevention device 29, and thereby, it becomes possible to provide the present embodiment at a low price and by the development for a short period of time.

FIG. 3 illustrates a seat back movement prevention device according to the embodiment in accordance with the first and second apsects. In the embodiment, the pretensioner 39 for the seat back 9 is accommodated in the casing 37 accommodating the ELR 25 and the pretensioner 27, to enable smallsizing of a whole of a seat back movement prevention device 43.

A necessary condition of layout at backward of the seat back is severe in an interior of a cab of a cab-over truck, and therefore, there is an advantage in which mountability on the interior of the cab improves by making the whole of the seat back movement prevention device 43 small as in the present embodiment.

Figure 4:
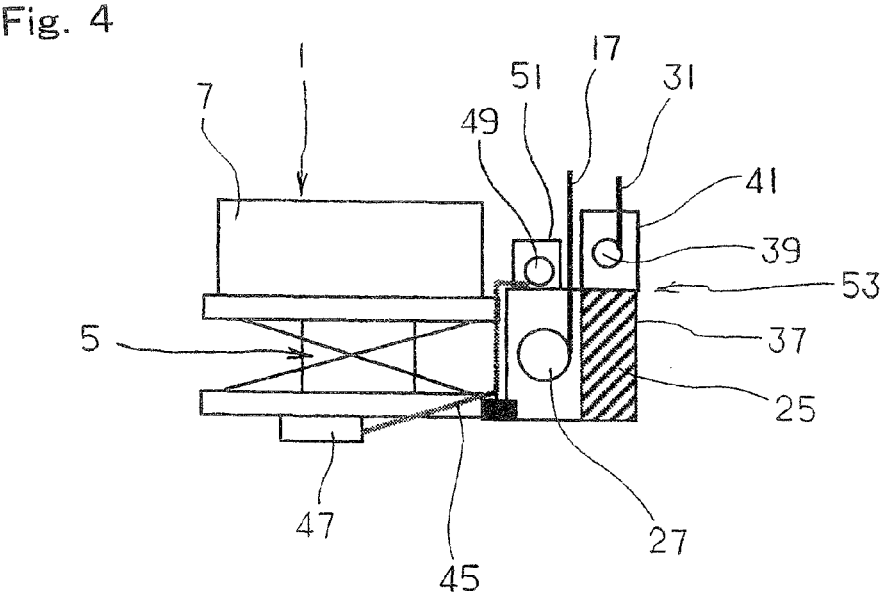
FIG. 4 is a schematic configuration diagram of the seat back movement prevention device according to an embodiment in accordance with the first and third aspects.

FIG. 4 illustrates a seat back movement prevention device according to the embodiment in accordance with the first and third aspects. The present embodiment is the one in which a seat back movement prevention device is applied to a belt-in seat being equipped with a tether belt enabling a movement suppression of an air suspension (seat suspension) at the vehicle collision time and adjusting a movement amount (stroke) in a longitudinal direction of the air suspension. Note that the same reference numerals are added to the same components as the embodiment in FIG. 1, and descriptions thereof are not given.

In the drawing, a reference numeral 45 is a tether belt, and one end of the tether belt 45 is coupled to a lifter 47 being equipped at a lower part of the air suspension 5. Besides, a casing 51 accommodating a third pretensioner (a pretensioner for the tether belt) 49 is disposed on the casing 37, and the other end side of the tether belt 45 penetrates the casing 51 and is coupled to the pretensioner 49 in the casing 51.

The pretensioner 49 has the same structure as the pretensioner 39, and it is the one rewinding the tether belt 45 by a built-in motor (not illustrated) at the activation time of the above-stated pretensioner 27, and the sensor of the airbag device is commonly used. The motor is activated for a time set in advance to rewind the tether belt 45 by the instruction of the control unit to which the signal from the sensor sensing the impact at the vehicle collision time is input, the gear locks it and the falling down of the whole of the belt-in seat 1 including the seat back 9 toward forward is suppressed and prevented as same as the pretensioner 39.

A seat back movement prevention device 53 according to the present embodiment is made up as stated above, and therefore, the pretensioner 27 immediately rewinds the loosenesses of the shoulder strap 17 and the lap strap simultaneously with the expansion of the airbag at the vehicle collision time, further the pretensioner 39 rewinds the belt 31 to suppress and prevent the falling down of the seat back 9 toward forward and the motor of the pretensioner 49 rewinds the tether belt 45, it is locked by the gear, and thereby, the falling down of the whole of the belt-in seat 1 including the seat back 9 toward forward is suppressed and prevented.

According to the present embodiment, the falling down of the whole of the belt-in seat 1 including the seat back 9 toward forward is suppressed and prevented, and thereby, it becomes possible to more certainly prevent the falling down of the seat back 9 compared to the above-stated respective embodiments.

Figure 5:
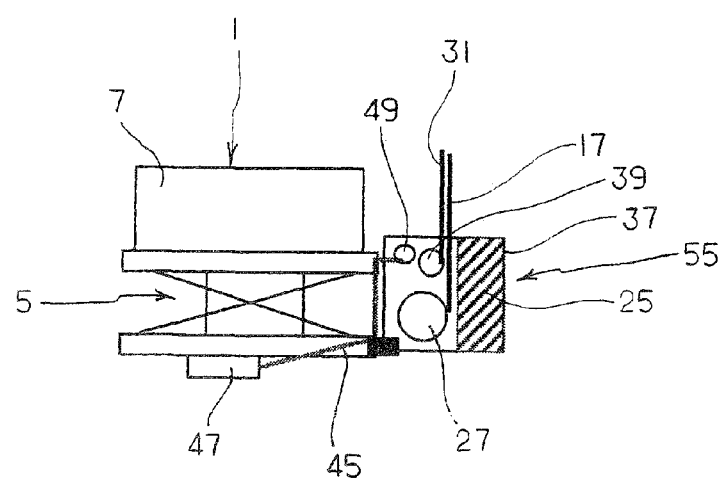
FIG. 5 is a schematic configuration diagram of the seat back movement prevention device according to an embodiment in accordance with the first and third aspects.

FIG. 5 illustrates a seat back movement prevention device according to the embodiment in accordance with the first and third aspects. The present embodiment is the one enabling the small-sizing of a whole of a seat back movement prevention device 55 by accommodating the pretensioner 49 in the casing 37 accommodating the pretensioners 27, 39.

According to the present embodiment, there is an advantage that the mountability on the interior of the cab of the cab-over truck of which layout necessary condition is severe improves compared to the embodiment in FIG. 4.

Figure 6:
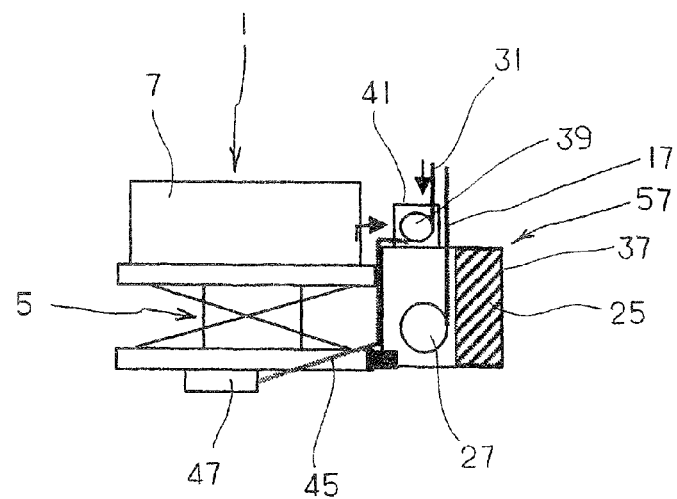
FIG. 6 is a schematic configuration diagram of the seat back movement prevention device according to an embodiment in accordance with the first, third and fourth aspects.

FIG. 6 illustrates a seat back movement prevention device according to the embodiment in accordance with the first, third and fourth aspects. The present embodiment is the one in which a function as the pretensioner for the tether belt is added to the pretensioner 39 for the seat back by commonly setting rewinding directions of the belt 31 and the tether belt 45 into, for example, a clockwise rotation.

Note that the other configurations are the same as the embodiments in FIG. 4 and FIG. 5, and therefore, the same reference numerals are added for the same components, and the descriptions thereof are not given.

It goes without saying that it is also possible to attain desired propositions according to a seat back movement prevention device 57 of the present embodiment as same as the embodiments in FIG. 4 and FIG. 5, and there is an advantage in which small-sizing of a whole of the seat back movement prevention device 57 is enabled as same as the embodiment in FIG. 5.

The many features and advantages of the embodiments are apparent from the detailed specification and, thus, it is intended by the appended claims to cover all such features and advantages of the embodiments that fall within the true spirit and scope thereof.

Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A seat back movement prevention device of a belt-in seat, comprising:
    the belt-in seat being equipped with an air suspension function as a seat suspension and a tether belt adjusting a movement amount of the air suspension;
    a wound body of which one end is connected to an upper part of a seat frame disposed in a seat back of a the belt-in seat; and
    a combination pretensioner being equipped at downward of the seat back, and simultaneously rewinding the wound body and the tether belt at an activation time of a pretensioner for a seat belt.

2. The seat back movement prevention device of the belt-in seat according to claim 1, wherein rewinding directions of the wound body and the tether belt are common.

* * * * *